United States Patent [19]

Favstritsky et al.

[11] Patent Number: 5,066,752

[45] Date of Patent: Nov. 19, 1991

[54] FLAME RETARDANT BROMINATED STYRENE-BASED POLYMERS

[75] Inventors: Nicolai A. Favstritsky; Jin-Liang Nang, both of Lafayette, Ind.

[73] Assignee: Great Lakes Chemical Corporation, West Lafayette, Ind.

[21] Appl. No.: 541,057

[22] Filed: Jun. 20, 1990

[51] Int. Cl.$^5$ ............................................. C08F 12/16
[52] U.S. Cl. .................... 526/293; 525/330.7; 525/330.8; 526/291; 526/292.7; 570/193
[58] Field of Search .................. 526/293, 291, 292.7; 525/330.7, 330.8

[56] References Cited

U.S. PATENT DOCUMENTS

| | | | |
|---|---|---|---|
| 3,025,277 | 3/1962 | Sterling | 526/293 |
| 3,497,484 | 2/1970 | Halasa | 526/293 |
| 3,959,398 | 5/1976 | Jalics | 526/293 |
| 4,028,486 | 6/1977 | Jalics | 526/293 |
| 4,151,223 | 4/1979 | Neuberg | 526/293 |
| 4,292,453 | 9/1981 | Daren | 570/193 |
| 4,412,051 | 10/1983 | de Man | 526/293 |

*Primary Examiner*—Joseph L. Schofer
*Assistant Examiner*—Fred Zitomer
*Attorney, Agent, or Firm*—Woodward, Emhardt, Naughton Moriarty & McNett

[57] ABSTRACT

Halogenated styrene-based polymers having surprisingly good physical properties in combination with flame retardancy include copolymers of ring-halogenated, ethylenically unsaturated aromatic monomers and aliphatic conjugated dienes having from 4 to 10 carbon atoms, and terpolymers of ring-halogenated, ethylenically unsaturated aromatic monomers, halogen-free aromatic monomers, and aliphatic conjugated dienes having from 4 to 10 carbon atoms.

33 Claims, No Drawings

FLAME RETARDANT BROMINATED STYRENE-BASED POLYMERS

BACKGROUND OF THE INVENTION

1. Field of the Invention

This invention relates to halogenated styrene-based polymers and the preparation thereof, and particularly to compositions such as dibromostyrene-butadiene and dibromostyrene-styrene-butadiene latices and their respective coagulated polymers, crosslinked and non-crosslinked.

2. Description of the Prior Art

Styrene based copolymers and terpolymers have found many applications in the prior art. Styrene-butadiene rubbers (SBR) containing low styrene proportions (15–35%) have been used for many applications, including tires, retreading, belting, footwear, wire and cable coating, sponge rubber, pressure-sensitive tape, reinforcement plastics and easy-processing polymers. Styrene-butadiene resins containing high percentages of styrene (60–83%) have been used as reinforcing resins and coating resins. Styrene-butadiene latices containing varying amounts of styrene (15–65%) have been used in fabric-to-rubber adhesives, foamed carpet backing, textile adhesives and carpet laminating. Crosslinked and non-crosslinked SBR polymers composed of 5–43% styrene have been used as adhesives and sealants.

Although such styrene based compounds have had wide usage, there has remained a need to prepare styrene polymers having better flame retardant properties. The usual method by which flame-retarding properties are imparted to plastics is the blending-in of flame retardants. Many of the commonly used flame retardants contain bromine, for example brominated diphenyl or diphenyloxide compounds. Together with antimony trioxide these flame retardants impart good flame-retarding properties when included in the plastics mixture by blending.

However, these flame retardants have a major disadvantage in that the processing of plastics incorporating brominated flame retardants can give rise to problems. For example, the flame retardant or decomposition products thereof may be released during processing. This can cause an offensive odor, and in certain cases noxious compounds may be released. In addition, these flame retardants may significantly affect the mechanical properties of the plastics in which they are contained.

Many proposals have been made to overcome such difficulties. A number of proposals simply amount to the replacement of the brominated compounds with compounds containing nitrogen and/or phosphorus, which compounds are similarly blended into the plastic. Although these compounds may present fewer problems in processing than the bromine-containing flame retardants, for the most part they also have the disadvantage of adversely influencing the mechanical properties of the plastics.

Nae, "New Epoxy Resins Based on Bromostyrene-Butadiene Cotelomers", *Polymer Prep.*, V.27(2), p. 399-400 (1986), described the synthesis of a limited class of epoxy resins based on the preparation of cotelomers which were subsequently epoxidized. Hydrogen peroxide was used as both the initiator and the telogen for the reaction of bromostyrene (mono di and tri) with 1,3-butadiene to yield cotelomers having terminal -OH groups. The cotelomers were semi-liquids or solids, with molecular weights ranging from 1,000 to 14,000. These random oligomers were then epoxidized to produce epoxy resins useful as a matrix for composite materials. In U.K. Patent Application GB 2,164,051A published on Mar. 12, 1986, Nae, et al. claimed the same OH-terminated cotelomers having molecular weights of 600 to about 14,000. These cotelomers were described as being useful components of flame retardant polymers, especially polyurethanes.

In Canadian Patent No. 907,229, issued on Aug. 8, 1972, Mackay described a latex of a carboxylic acid based polymer. In addition to an $\alpha,\beta$-ethylenically unsaturated carboxylic acid monomer or a compound hydrolyzable to such a carboxylic acid monomer, the polymers comprised a ring-halogenated ethylenically unsaturated aromatic monomer (e.g., monochlorostyrene) and an aliphatic conjugated diene (e.g., butadiene). Mackay indicated that the practice of his invention in preparing fire-resistant latex foam required a carboxylic acid, a melamine-formaldehyde resin, antimony trioxide and a filler comprising an amphoteric metal oxide hydrate. Neither a copolymer of the class of dibromostyrene-butadiene, nor a terpolymer such as dibromostyrene-styrene-butadiene was discussed. Mackay did disclose that a small amount of styrene could be used along with the above prescribed monomers in the copolymer, and indicated in one example that 2,4-dibromostyrene as a monomer was used to prepare a carboxylic latex containing acrylic acid, dibromostyrene and 1,3-butadiene.

SUMMARY OF THE INVENTION

Briefly describing one aspect of the present invention, there are provided flame retardant copolymers comprising ring-halogenated, ethylenically unsaturated aromatic monomers and aliphatic conjugated dienes having from 4 to 10 carbon atoms. Copolymers according to the present invention include compositions represented by the formula:

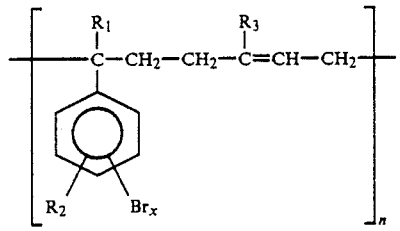

in which n is an integer; $R_1$ is H or $CH_3$; $R_2$ is H or a $C_{1-4}$ lower alkyl group; $R_3$ is H, Cl or $CH_3$; and $x=1$ to 4.

In a further aspect of the present invention, there are provided terpolymers of ring-halogenated, ethylenically unsaturated aromatic monomers, halogen-free aromatic monomers, and aliphatic conjugated dienes having from 4 to 10 carbon atoms. Terpolymers according to the present invention include compositions represented by the formula:

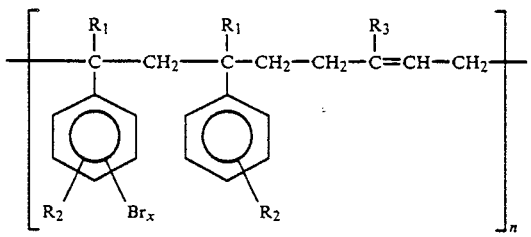

in which n is an integer; $R_1$ is H or $CH_3$; $R_2$ is H or a $C_{1-4}$ lower alkyl group; $R_3$ is H, Cl or $CH_3$; and $x = 1$ to 4.

The copolymers and terpolymers of the present invention have a molecular weight of at least about 25,000. Preferably, the molecular weight is at least about 100,000.

It is an object of the present invention to provide halogenated, styrene-based polymers having desirable physical properties in combination with increased flame retardancy.

A further object of the present invention is to provide polymers utilizing ring-halogenated aromatic monomers in partial or total substitution for non-halogenated aromatic monomers used in prior art compositions.

Another object of the present invention is to provide polymers such as dibromostyrene-butadiene and dibromostyrenestyrene-butadiene latices and their respective coagulated polymers, crosslinked and non-crosslinked.

Further objects and advantages of the present invention will be apparent from the description which follows.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

The present invention provides styrene based compositions having improved flame retardancy. The partial or total replacement of styrene with brominated styrene in styrene-butadiene rubbers, styrene-butadiene resins and styrene-butadiene latices imparts fire retardancy and solvent, chemical and oil resistance not previously available. In addition, these novel products can be used as impact modifiers and compatibilizers to thermoplastic resins such as high impact polystyrene, polyvinyl chloride, polypropylene, ABS, and other thermoplastic and thermosetting resins. The polymer latices are useful as fire retardant fabric backcoatings, coatings, paints and adhesives.

In accordance with one embodiment of the present invention, there are provided flame retardant copolymer compositions comprising units from ring-halogenated, ethylenically unsaturated aromatic monomers and units from aliphatic conjugated dienes having from 4 to 10 carbon atoms. In a second embodiment there are provided flame retardant terpolymers comprising units from ring-halogenated, ethylenically unsaturated aromatic monomers, units from halogen-free aromatic monomers, and units from aliphatic conjugated dienes having from 4 to 10 carbon atoms.

The ring-halogenated monomers of both the copolymers and terpolymers are used in partial or total replacement of comparable non-halogenated monomers used in prior art compositions. Representative ring-halogenated aromatic monomers are mono-, di-, tri- and tetrabromo- forms of styrene, methylstyrene, α-methylstyrene, α-methyl methylstyrene, ethylstyrene or α-methyl ethylstyrene. Mixtures or mixed isomers of the above monomers may also be used. The preferred monomer is polybrominated styrene, with dibromostyrene being most preferred. As produced by Great Lakes Chemical Corporation, dibromostyrene normally contains about 15 percent monobromostyrene and 3 percent tribromostyrene by weight.

The ring halogen may be either chlorine or bromine, and is preferably bromine. In the preferred embodiments for the copolymers and terpolymers of the present invention, the ring halogenated aromatic monomers are included in an amount to provide between about 10 and about 60 percent of bromine by weight based on the total weight of the copolymer or terpolymer, respectively.

The conjugated diene monomers for both the copolymers and terpolymers preferably have from 4 to 10 carbon atoms, and may be of the type used in related prior art compositions. Representative of the conjugated diene monomers are 1,3-butadiene, isoprene, 2,3-dimethyl-1,3-butadiene, chloroprene, piperylene and other hydrocarbon homologs of 1,3-butadiene. The preferred monomer is butadiene, chloroprene or isoprene, particularly butadiene.

According to the first embodiment, there are provided copolymers of the ring-halogenated aromatic monomers and the conjugated diene monomers. For such copolymers, the ring-halogenated aromatic monomer is used in an amount to provide from about 95 to about 5 percent by weight of the monomer based on total weight of the copolymer. The preferred amount of ring-halogenated aromatic monomer is about 88 to about 25 percent by weight. Also for the copolymer compositions, the conjugated diene is used in an amount to provide from about 5 to about 95 percent by weight, preferably from about 12 to about 75 percent by weight, of the conjugated diene monomer based on total weight of the copolymer.

Copolymers according to the present invention include compositions represented by the formula:

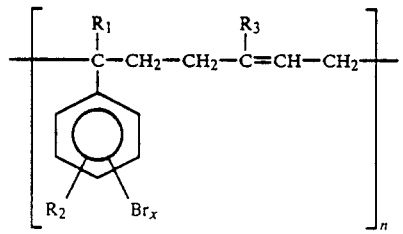

in which n is an integer; $R_1$ is H or $CH_3$; $R_2$ is H or a $C_{1-4}$ lower alkyl group; $R_3$ is H, Cl or $CH_3$; and $x = 1$ to 4.

According to the second embodiment of the present invention, there are provided terpolymers of halogen-free aromatic monomers as well as the ring-halogenated aromatic monomers and the conjugated diene monomers. Representative halogen-free aromatic monomers are styrene, α-methylstyrene, methylstyrene, α-methyl methylstyrene, ethylstyrene and α-methyl ethylstyrene. The preferred halogen-free aromatic monomer is styrene or α-methylstyrene.

For such terpolymers, the ring-halogenated aromatic monomer is used in an amount to provide from about 90 to about 5 percent by weight of the monomer based on total weight of the terpolymer. The preferred amount of ring-halogenated aromatic monomer is about 40 to about 20 percent by weight. The halogen-free aromatic monomer comprises about 5 to about 95 weight percent, preferably about 10 to about 68 weight percent, based on total weight of the terpolymer. Also for the terpolymer compositions, the conjugated diene is used in an amount to provide from about 90 to about 5 percent by weight, preferably from about 50 to about 12 percent by weight, of the aliphatic conjugated diene monomer based on total weight of the terpolymer.

Terpolymers according to the present invention include compositions represented by the formula:

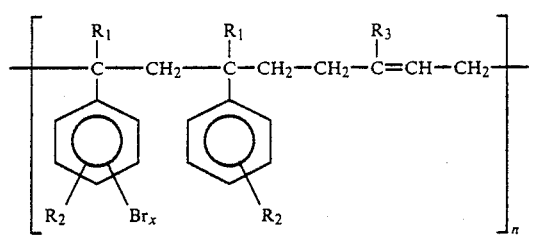

in which n is an integer; $R_1$ is H or $CH_3$; $R_2$ is H or a $C_{1-4}$ lower alkyl group; $R_3$ is H, Cl or $CH_3$; and $x=1$ to 4.

The copolymers and terpolymers of the present invention have a molecular weight of at least about 25,000. Preferably, the molecular weight is at least about 100,000.

Techniques for preparation of the copolymers and terpolymers include solution, bulk, emulsion and suspension polymerization. Suitable initiators include the initiators used for free radical polymerization such as organic peroxides, hydroperoxides, azo or diazo compounds, persulfates, redox systems, etc. Useful emulsifiers include anionic, cationic, nonionic or amphoteric. Chain transfer agents include aliphatic, aryl mercaptans and disulfides, $CCl_4$, $CBr_4$, $CHI_3$ and $CHCl_3$, etc. Among these, mercaptans are preferred.

Polymerization may be carried out in the presence of air. Faster reactions are observed in the absence of oxygen at temperatures ranging from −30° to 110° C., with preferred temperatures ranging from about 0° C. to about 60° C.

Polymerization may be terminated short of completion to yield products having selected molecular weights. For example, termination at 45–75% conversion generally yields product which is non-crosslinked latex and its coagulated polymer. Termination at 75–100% conversion generally produces product comprising crosslinked latex and its coagulated polymer.

Latices and their polymers can be stabilized by incorporation of 0.5 to 4 parts antioxidant per 100 parts polymer, preferably 1 to 2 parts antioxidant. Suitable antioxidants include alkylated-arylated bisphenolic phosphite, tris(nonylphenyl)phosphite, styrenated phenol, bis-(alkylthiopropionate)diesters, diaryl-p-phenylenediamines, mixed styrenated diphenylamines (Wingstay 29 from Goodyear, Akron, OH) and butylated reaction product of p-cresol and dicyclopentadiene, (Vanox L from Goodyear, Akron, OH).

The invention will be further described with reference to the following specific Examples. However, it will be understood that these Examples are illustrative and not restrictive in nature. In the following Examples, percents indicated are percents by weight unless indicated otherwise.

EXAMPLES 1–8

PREPARATION OF COPOLYMERS AT HIGH CONVERSION

A soap solution (a mixture of 180 parts deionized water, 5 parts sodium dodecyl sulfate, 0.3 parts potassium persulfate, and 0.3 parts sodium bisulfite) was prepared and charged into a 32 oz. bottle. To the bottle, a mixture of 20–88 parts dibromostyrene and 0.175 parts n-dodecyl mercaptan was charged. The bottle (with cap) was weighed on a balance, and 12–80 parts butadiene added slowly until an excess (1 to 2 parts) was present. The cap was then placed loosely on the neck of the bottle, and the butadiene was allowed to evaporate until the correct weight was established. The cap was sealed with rubber and TEFLON gaskets and was then tightened quickly by hand using rubber gloves. The bottle was placed in a clamp in a 50° C. water bath and rotated. The reaction was allowed to run for a certain period of time (2 to 20.75 hr), after which the bottle was removed from the water bath and placed in ice-water for 10 minutes.

The chilled bottle was then tested for pressure by inserting a needle through the cap. When no pressure was apparent, the bottle was opened and the contents dripped into a 6% aqueous $MgSO_4$ solution under stirring, followed by coagulation of this mixture by dripping into rapidly stirred methanol. The coagulated polymer was filtered, air-dried, frozen, ground and dried in a vacuum oven at 25°–110° C. to a constant weight. The polymers were insoluble in tetrahydrofuran, chloroform and toluene. Bromine content (% Br) of the polymer was measured by Schöninger Combustion Method and weight loss (% loss) measured at a rate of 20° C./min. by Thermogravimetric Analysis (TGA). Results for the polymers are tabulated in Table I.

TABLE I

| | Preparation of Copolymers at High Conversion | | | | | | | | | | |
|---|---|---|---|---|---|---|---|---|---|---|---|
| | | | Monomer[1] | | Polymer[2] | | | | | | |
| | Reaction | Conversion | Charge | BR | Composition | | | TGA. Loss at °C. | | | |
| Ex. | Time/hr | % | M:B | % | M:B | 5% | 10% | 25% | 50% | 75% | 95% |
| 1 | 2 | 96 | 88:12 | 49.5 | 83:17 | 338 | 366 | 390 | 416 | 441 | 472 |
| 2 | 2.5 | 97 | 75:25 | 44.1 | 74:26 | 378 | 388 | 408 | 435 | 460 | 492 |
| 3 | 3 | 86 | 67:33 | 40.5 | 67:33 | 377 | 388 | 411 | 441 | 465 | 488 |
| 4 | 5.25 | 93 | 60:40 | 35.3 | 59:41 | 369 | 384 | 418 | 453 | 474 | 683 |
| 5 | 14.42 | 97 | 50:50 | 28.2 | 47:53 | 379 | 394 | 424 | 457 | 478 | 504 |

TABLE I-continued

Preparation of Copolymers at High Conversion

| Ex. | Reaction Time/hr | Conversion % | Monomer[1] Charge M:B | BR % | Polymer[2] Composition M:B | TGA, Loss at °C. | | | | | |
|---|---|---|---|---|---|---|---|---|---|---|---|
| | | | | | | 5% | 10% | 25% | 50% | 75% | 95% |
| 6 | 14.42 | 98 | 40:60 | 20.9 | 35:65 | 381 | 396 | 430 | 457 | 479 | 699 |
| 7 | 20.75 | 94 | 25:75 | 15.2 | 25:75 | 392 | 419 | 440 | 461 | 478 | 596 |
| 8 | 20.25 | 92 | 20:80 | 11.3 | 19:81 | 388 | 402 | 446 | 474 | 491 | 513 |

[1]M = dibromostyrene; B = butadiene
[2]Based on % Br.

EXAMPLES 9 and 10

PREPARATION OF COPOLYMERS AT LOW CONVERSION

The general procedure of Examples 1–8 was repeated here except that the polymerization reaction was allowed to reach 71–74% conversion at 27–28% solids in 3.33–3.5 hr at 50° C. These latices were shortstopped with 3 parts deionized water and 0.18 parts 50% $H_2O_2$ and antioxidized with 1 part Vanox L (butylated reaction product of p-cresol and dicyclopentadiene from Goodyear, Akron, OH) before the coagulation. These polymers were soluble in tetrahydrofuran and had an average molecular weight of 135,000 based on a standard molecular weight (MW) of polystyrene (PS) by GPC. Results of the preparation are tabulated in Table II below.

TABLE II

Preparation of Copolymers at Low Conversion

| Ex. | Reaction Time/hr | Conversion % | Monomer[1] Charge M:B | BR % | Polymer[2] Composition M:B | MW (ps) | TGA, Loss at °C. | | | | | |
|---|---|---|---|---|---|---|---|---|---|---|---|---|
| | | | | | | | 5% | 10% | 25% | 50% | 75% | 95% |
| 9 | 3.5 | 74 | 60:40 | 40.25 | 67:33 | 122,000 | 386 | 398 | 417 | 447 | 472 | 499 |
| 10 | 3.33 | 71 | 57:43 | 37.89 | 63:37 | 148,000 | 380 | 395 | 415 | 445 | 469 | 560 |

[1]M = dibromostyrene; B = butadiene
[2]Based on % Br.

EXAMPLE 11

SCALE-UP OF COPOLYMER PREPARATION

A 2 l Parr reactor was charged with a soap solution of 1014 g deionized water, 28 g sodium dodecyl sulfate, 1.87 g sodium bicarbonate, 1.87 g potassium persulfate and 1.87 g sodium bisulfite. To this reactor containing soap solution was added a mixture of 420 g dibromostyrene and 0.98 g n-dodecyl mercaptan, followed by the addition of 140 g butadiene. The contents of the reactor were allowed to react for one and a half hours to 30 percent solids; the temperature was gradually allowed to increase from room temperature to 90° C. The reactor was cooled to room temperature, and the copolymer was recovered by dripping into 6 percent aqueous $MgSO_4$ solution and then coagulated in methanol under rapid stirring. The coagulated polymer was filtered, air-dried, frozen, ground and dried in a 50° C. vacuum oven to constant weight. The polymer weighed 482 g (86% yield) and was soluble in tetrahydrofuran, chloroform and toluene. The result of the preparation is tabulated in Table III.

TABLE III

Scale-Up of Copolymer Preparation

| Ex. | Reaction Time/hr | Conversion % | Monomer[1] Charge M:B | BR % | Polymer[2] Composition M:B | TGA, Loss at °C. | | | | | |
|---|---|---|---|---|---|---|---|---|---|---|---|
| | | | | | | 5% | 10% | 25% | 50% | 75% | 95% |
| 11 | 1.5 | 80 | 75:25 | 45.45 | 76:24 | 368 | 380 | 404 | 433 | 457 | 479 |

[1]M = dibromostyrene; B = butadiene
[2]Based on % Br.

EXAMPLES 12-14

PREPARATION OF TERPOLYMERS AT HIGH CONVERSION

The general procedure of Examples 1–8 was repeated here to prepare terpolymers which contained 40–20 percent by weight of dibromostyrene, 19–68 percent by weight of styrene and 40–13 percent by weight of butadiene. The reaction reached 94 percent conversion at 35 percent solids at 50° C. in 4.25 to 14.33 hr, as shown in Table IV. In Example 12, a terpolymer of 19/68/13 was soluble in tetrahydrofuran, chloroform and toluene and had an average molecular weight of 165,000 relative to polystyrene by GPC, whereas terpolymers of 40/20/40 and 35/25/40 were insoluble.

TABLE IV

Preparation of Terpolymers at High Conversion

| Ex. | Reaction Time/hr | Conversion % | Monomer[1] Charge M:S:B | BR % | Polymer[2] Composition M:S:B | MW (ps) | TGA, Loss at °C. | | | | | |
|---|---|---|---|---|---|---|---|---|---|---|---|---|
| | | | | | | | 5% | 10% | 25% | 50% | 75% | 95% |
| 12 | 4.25 | 94 | 20:68:12 | 11.50 | 19:68:13 | 165,000 | 350 | 378 | 400 | 418 | 438 | 699 |
| 13 | 14.33 | 94 | 40:20:40 | 23.58 | — | — | 384 | 495 | 417 | 448 | 474 | 512 |

TABLE IV-continued

| | | | Preparation of Terpolymers at High Conversion | | | | | | | | | |
|---|---|---|---|---|---|---|---|---|---|---|---|---|
| | Reaction | Conversion | Monomer[1] Charge | BR | Polymer[2] Composition | MW | TGA, Loss at °C. | | | | | |
| Ex. | Time/hr | % | M:S:B | % | M:S:B | (ps) | 5% | 10% | 25% | 50% | 75% | 95% |
| 14 | 14.33 | 93 | 35:25:40 | 19.37 | — | — | 385 | 397 | 418 | 449 | 475 | 699 |

[1]M = dibromostyrene; S = styrene; B = butadiene
[2]Calculated composition based on % Br and $^1$H NMR integration

EXAMPLE 15

SCALE-UP OF TERPOLYMERS AT HIGH CONVERSION

The general procedure of Example 11 was repeated here to prepare a terpolymer which contained 19 weight percent of dibromostyrene, 67 weight percent of styrene and 14 weight percent of butadiene. The monomers were polymerized to approximately 100 percent conversion at 37 percent solids in 2.5 hr, and the temperature was gradually increased from room temperature to 65° C. The coagulated terpolymer was soluble in tetrahydrofuran, chloroform and toluene and had an average molecular weight of 119,000 relative to polystyrene. The result of the preparation is tabulated in Table V.

preferred embodiments have been described, and that all changes and modifications that come within the spirit of the invention are desired to be protected.

What is claimed is:

1. A thermally and hydrolytically stable flame retardant copolymer comprising:
   about 95 to about 5 weight percent of units from ring brominated, ethylenically unsaturated aromatic monomer, said monomer including greater than about 1 and up to about 4 bromines per unit; and
   about 5 to about 95 weight percent of units from aliphatic conjugated diene monomer having from 4 to 10 carbon atoms,
   said copolymer having a molecular weight of at least about 25,000.

2. The copolymer of claim 1 in which bromine com-

TABLE V

| | | | Scale-Up of Terpolymer at High Conversion | | | | | | | | | |
|---|---|---|---|---|---|---|---|---|---|---|---|---|
| | Reaction | Conversion | Monomer[1] Charge | BR | Polymer[2] Composition | MW | TGA, Loss at °C. | | | | | |
| Ex. | Time/hr | % | M:S:B | % | M:S:B | (ps) | 5% | 10% | 25% | 50% | 75% | 95% |
| 15 | 2.5 | 97 | 20:68:12 | 11.40 | 19:67:14 | 119,000 | 359 | 378 | 399 | 417 | 436 | 472 |

[1]M = dibromostyrene; S = styrene; B = butadiene
[2]Calculated composition based on % Br and $^1$H NMR integration

EXAMPLES 16-19

PREPARATION OF TERPOLYMERS AT LOW CONVERSION

Preparation of 35-40/20-25/40 terpolymers at low conversion (47-64 percent) was carried out in a 32 oz. bottle by the same technique as described in Examples 1-8 except that these monomers were polymerized to approximately 47-64 percent conversion at 18-25 percent solids in 3.5 hr to 5 hr. 12 min. at 50° C. These latices were shortstopped with 3 parts deionized water and 0.18 parts 50 percent $H_2O_2$ and antioxidized with 1 part Vanox L before the coagulation. The coagulated products were dissolved in tetrahydrofuran, chloroform and toluene and had a molecular weight of 134,000 to 194,000 relative to polystyrene. Results of the preparation are tabulated in Table VI.

prises from about 10 to about 60 weight percent based on the weight of the copolymer.

3. The copolymer of claim 1 and which comprises about 88 to about 25 weight percent of units from said aromatic monomer and about 12 to about 75 weight percent of units from said diene.

4. The copolymer of claim 1 in which said aromatic monomer is selected from the group consisting of di-, tri- and tetrabromo- forms of styrene, methylstyrene, α-methylstyrene, α-methyl methylstyrene, ethylstyrene, α-methyl ethylstyrene and mixtures thereof with each other and with monobromostyrene.

5. The copolymer of claim 4 in which said aromatic monomer is selected from the group consisting of dibromostyrene, tribromostyrene, tetrabromostyrene and mixtures thereof with each other and with monobromostyrene.

6. The copolymer of claim 4 in which said aromatic

TABLE VI

| | | | Preparation of Terpolymers at Low Conversion | | | | | | | | | |
|---|---|---|---|---|---|---|---|---|---|---|---|---|
| | Reaction | Conversion | Monomer[1] Charge | BR | Polymer[2] Composition | MW | TGA, Loss at °C. | | | | | |
| Ex. | Time/hr | % | M:S:B | % | M:S:B | (ps) | 5% | 10% | 25% | 50% | 75% | 95% |
| 16 | 3.5 | 58 | 40:20:40 | 27.89 | 46:21:32 | 144,000 | 385 | 394 | 414 | 441 | 469 | 496 |
| 17 | 4.2 | 64 | 40:20:40 | 28.29 | 47:16:37 | 194,000 | 378 | 394 | 413 | 443 | 468 | 496 |
| 18 | 3.5 | 47 | 35:25:40 | 24.85 | 41:31:27 | 134,000 | 377 | 389 | 409 | 435 | 460 | 490 |
| 19 | 4.2 | 61 | 35:25:40 | 25.97 | 43:19:38 | 161,000 | 381 | 394 | 414 | 444 | 470 | 496 |

[1]M = dibromostyrene; S = styrene; B = butadiene
[2]Calculated composition based on % Br and $^1$H NMR integration While the invention has been described in detail in the foregoing description and its specific Examples, the same is to be considered as illustrative and not restrictive in character. It is to be understood that only the monomer is dibromostyrene.

7. The copolymer of claim 1 in which said diene is selected from the group consisting of 1,3-butadiene, chloroprene, isoprene, 2,3-dimethyl-1,3-butadiene, piperylene.

8. The copolymer of claim 7 in which said diene is butadiene.

9. The copolymer of claim 1 and which has a molecular weight of at least about 100,000.

10. The copolymer of claim 1 and which is in a latex form.

11. The copolymer of claim 1 and which is free of terminal -OH groups.

12. The copolymer of claim 1 and which is substantially free of carboxylic acid and derivatives thereof.

13. The copolymer of claim 1 and which consists essentially of about 88 to about 25 weight percent of units from said aromatic monomer and about 12 to about 75 weight percent of units from said diene.

14. The copolymer of claim 13 and which has a molecular weight of at least about 100,000.

15. A thermally and hydrolytically stable flame retardant copolymer comprising the formula:

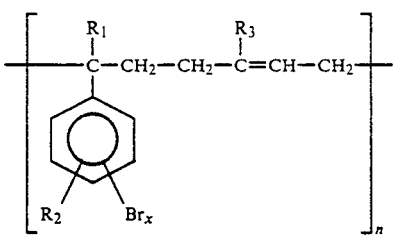

in which n is an integer; $R_1$ is H or $CH_3$; $R_2$ is H or a $C_{1-4}$ lower alkyl group; $R_3$ is H, Cl or $CH_3$; and x = greater than 1 to 4, said polymer having a molecular weight of at least about 25,000.

16. A thermally and hydrolytically stable flame retardant terpolymer comprising:
about 90 to about 5 weight percent of units from ring-brominated, ethylenically unsaturated aromatic monomer, said monomer including greater than about 1 and up to about 4 bromines per unit;
about 5 to about 90 weight percent of units from halogen-free aromatic monomer; and
about 90 to about 5 weight percent of units from aliphatic conjugated diene monomer having from 4 to 10 carbon atoms,
said terpolymer having a molecular weight of at least about 25,000.

17. The terpolymer of claim 16 in which bromine comprises from about 10 to about 60 weight percent based on the weight of the terpolymer.

18. The terpolymer of claim 16 and which comprises about 40 to about 20 weight percent of units from said ring-brominated aromatic monomer, about 10 to about 68 weight percent of units from said halogen-free aromatic monomer, and about 50 to about 12 weight percent of units from said diene.

19. The terpolymer of claim 16 in which said aromatic monomer is selected from the group consisting of di-, tri- and tetrabromo- forms of styrene, methylstyrene, α-methylstyrene, α-methyl methylstyrene, ethylstyrene, α-methyl ethylstyrene and mixtures thereof with each other and with monobromostyrene.

20. The terpolymer of claim 19 in which said aromatic monomer is selected from the group consisting of dibromostyrene, tribromostyrene, tetrabromostyrene and mixtures thereof with each other and with monobromostyrene.

21. The terpolymer of claim 19 in which said aromatic monomer is dibromostyrene.

22. The terpolymer of claim 16 in which said halogen-free aromatic monomer is selected from the group consisting of styrene, α-methylstyrene, methylstyrene, α-methyl methylstyrene, ethylstyrene, α-methyl ethylstyrene and mixtures thereof.

23. The terpolymer of claim 22 in which said halogen-free aromatic monomer is selected from the group consisting of styrene and α-methylstyrene.

24. The terpolymer of claim 16 in which said diene is selected from the group consisting of 1,3-butadiene, chloroprene, isoprene, 2,3-dimethyl-1,3-butadiene, piperylene.

25. The terpolymer of claim 24 in which said diene is butadiene.

26. The terpolymer of claim 25 in which said aromatic monomer is dibromostyrene and in which said halogen-free aromatic monomer is styrene.

27. The terpolymer of claim 16 and which has a molecular weight of at least about 100,000.

28. The terpolymer of claim 16 and which is in a latex form.

29. The terpolymer of claim 16 and which does not have terminal -OH groups.

30. The terpolymer of claim 16 and which is substantially free of carboxylic acid and derivatives thereof.

31. The terpolymer of claim 16 and which consists essentially of about 40 to about 20 weight percent of units from said ring-brominated aromatic monomer, about 10 to about 68 weight percent of units from said halogen-free aromatic monomer, and about 50 to about 12 weight percent of units from said diene.

32. The terpolymer of claim 31 and which has a molecular weight of at least about 100,000.

33. A thermally and hydrolytically stable flame retardant terpolymer comprising the formula:

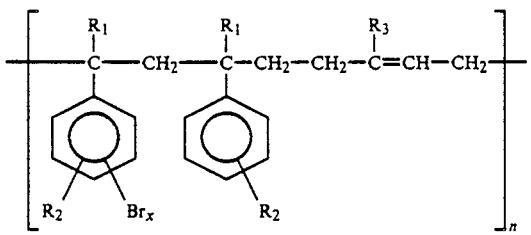

in which n is an integer; $R_1$ is H or $CH_3$; $R_2$ is H or a $C_{1-4}$ lower alkyl group; $R_3$ is H, Cl or $CH_3$; and x = greater than 1 to 4, said polymer having a molecular weight of at least about 25,000.

* * * * *

UNITED STATES PATENT AND TRADEMARK OFFICE
CERTIFICATE OF CORRECTION

PATENT NO. : 5,066,752

DATED : November 19, 1991

INVENTOR(S) : Nicolai A. Favstritsky and Jin-liang Wang

It is certified that error appears in the above-identified patent and that said Letters Patent is hereby corrected as shown below:

On the title page
Please correct the second inventor name from "Jin-Liang NANG" to --Jin-liang WANG--.

In column 3, line 29, change "bromostyrenestyrene-butadiene" to --bromostyrene-styrene-butadiene--.

Signed and Sealed this

Twentieth Day of April, 1993

Attest:

MICHAEL K. KIRK

*Attesting Officer*  *Acting Commissioner of Patents and Trademarks*